Figure 1:
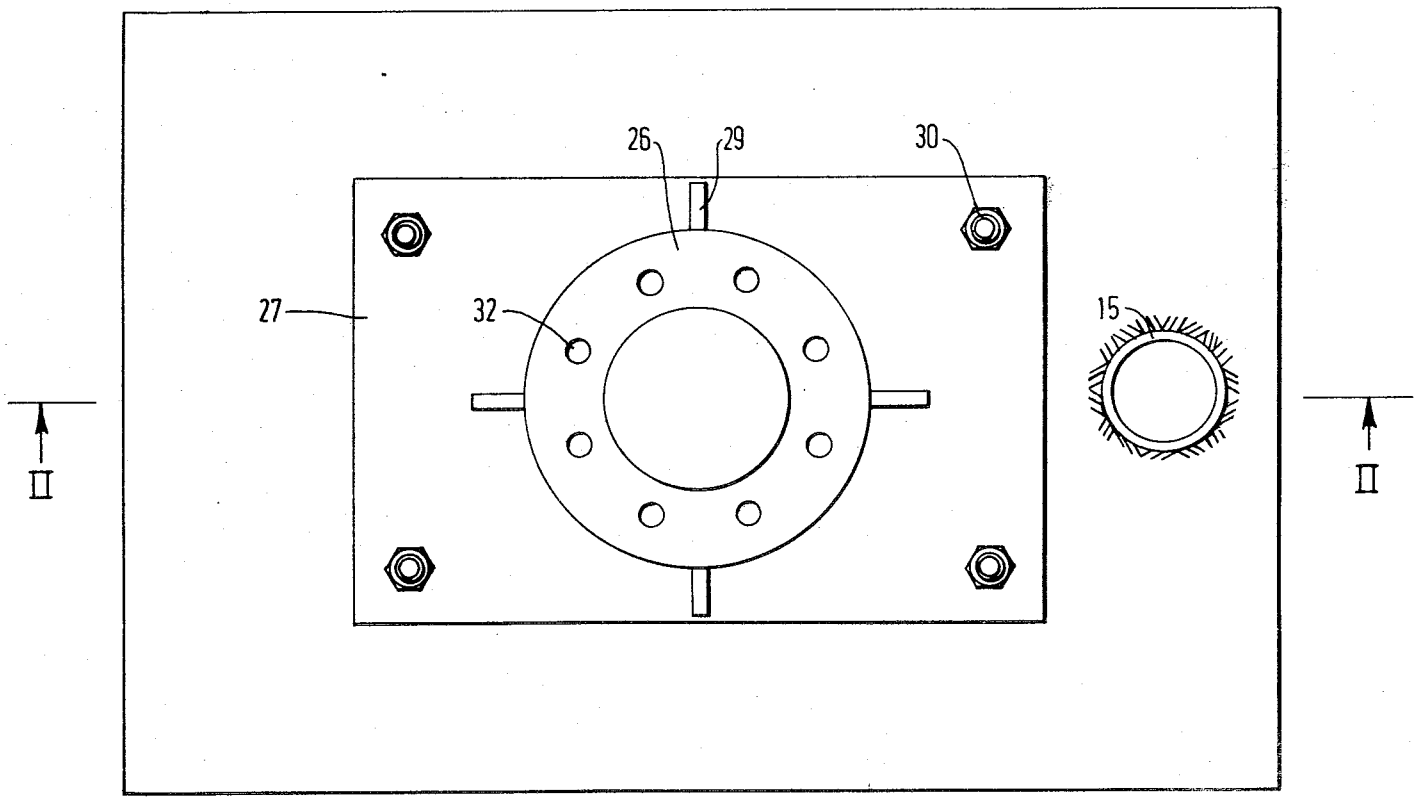
Figure 2:
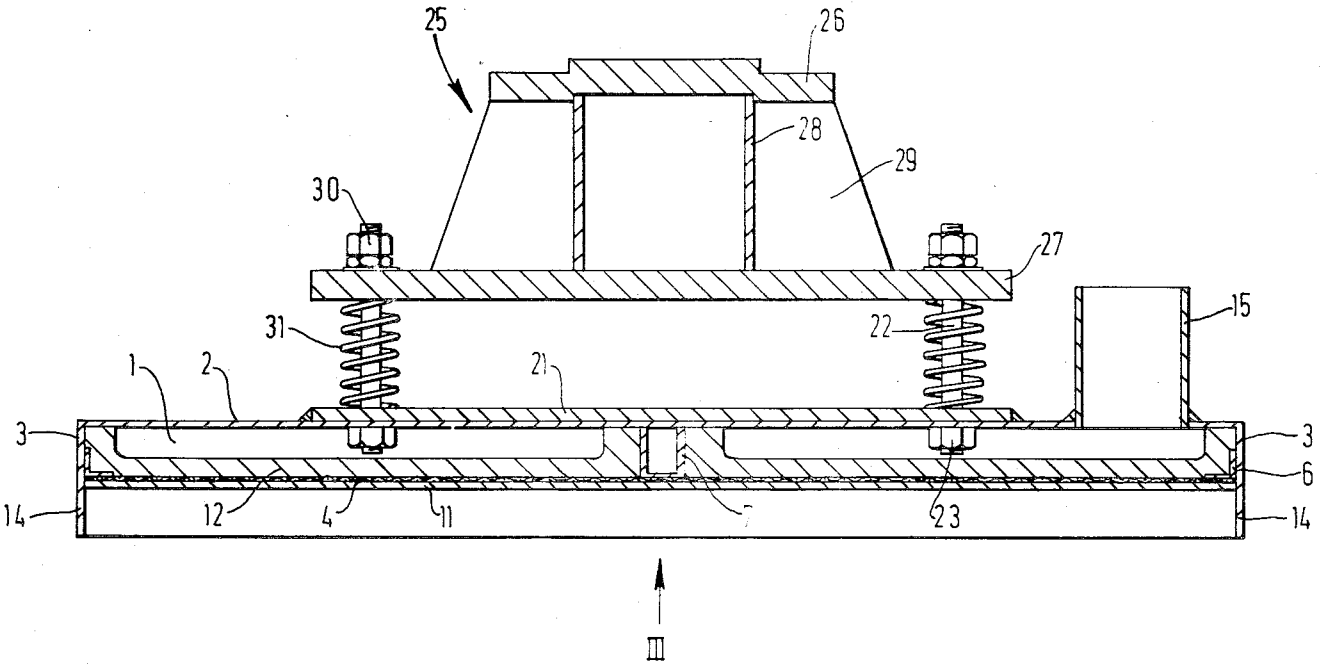
Figure 3:
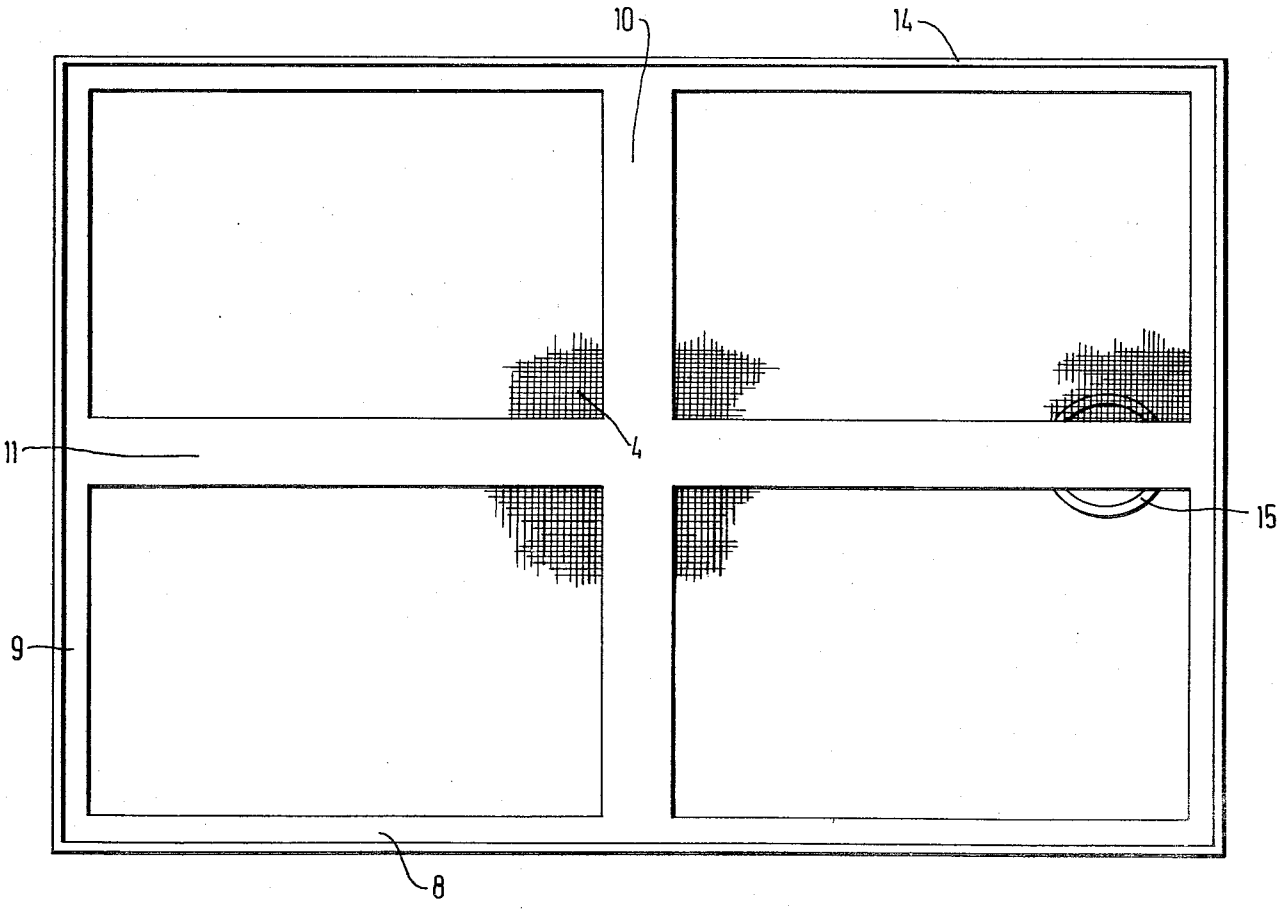
Figure 4:
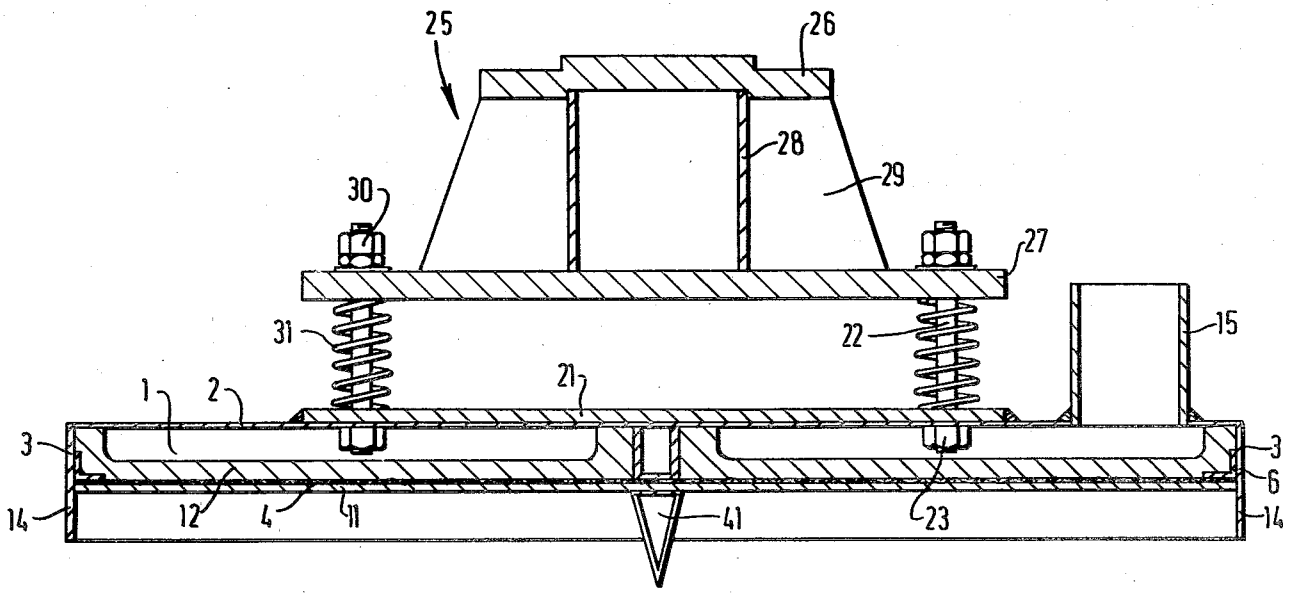
Figure 5:
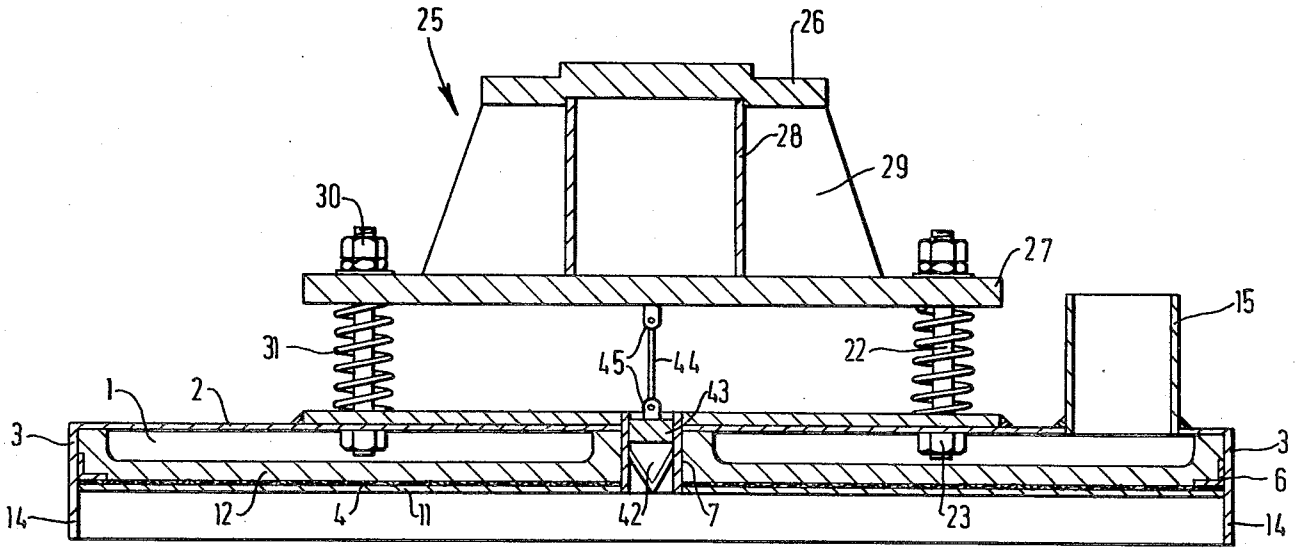

United States Defensive Publication [19] (H) [11] T100,001

Frazer [43] Nov. 4, 1980

[54] SUCTION DEVICE

[75] Inventor: Roy M. Frazer, Hitchin, England

[73] Assignee: Imperial Chemical Industries Limited, London, England

[21] Appl. No.: 59,447

[22] Filed: Jul. 20, 1979

[30] Foreign Application Priority Data

Apr. 11, 1979 [GB] United Kingdom ..... 12741/79
Jun. 25, 1979 [GB] United Kingdom ..... 22060/79

[51] Int. Cl.[3] ..... B66C 1/02
[52] U.S. Cl. ..... 294/64 R; 414/627; 414/737; 414/786

[57] ABSTRACT

A suction device suitable for gripping porous sacks filled with free-flowing particulate materials is disclosed. The device comprises a vacuum chamber with a porous base and a rigid wall extending continuously around the periphery of the base on the side remote from the chamber. In use the device is placed on the sack and suction is applied until the sack and its contents rigidify as the air is drawn out from between the particles, through the porous sack. With the suction device attached to a robot arm, crane hoist or other lifting means, the rigidified sacks can be readily handled, e.g. during palletizing and depalletizing operations. The device may also be adapted for gripping filled sacks which are not naturally porous, for instance polyethylene sacks, by incorporating means, such as a knife, for piercing the sack within the area bounded by the rigid wall. For safety reasons, the piercing means preferably has associated protection which permits piercing of the sack but which shields it at other times.

11 Claims, 5 Sheets Drawing,

16 Pages Specification

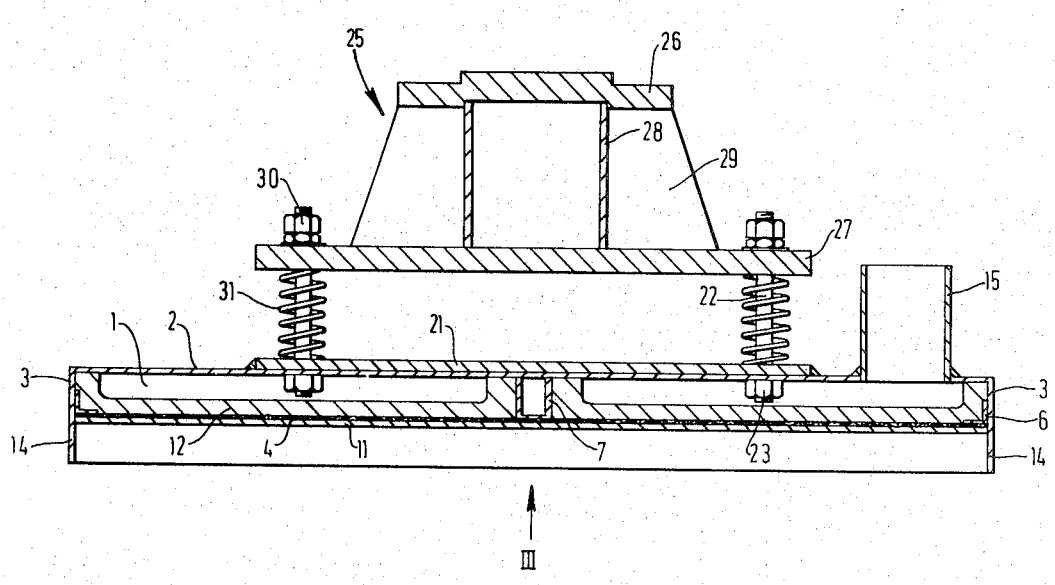

The file of this unexamined application may be inspected and copies thereof may be purchased (849 O.G. 1221, Apr. 9, 1968).